United States Patent
Ahn et al.

(10) Patent No.: US 10,433,332 B2
(45) Date of Patent: Oct. 1, 2019

(54) METHOD FOR TRANSMITTING UPLINK IN UNLICENSED BAND AND DEVICE USING SAME

(71) Applicant: LG ELECTRONICS INC., Seoul (KR)

(72) Inventors: Joonkui Ahn, Seoul (KR); Suckchel Yang, Seoul (KR); Hanbyul Seo, Seoul (KR); Yunjung Yi, Seoul (KR); Seonwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 80 days.

(21) Appl. No.: 15/523,834

(22) PCT Filed: Nov. 3, 2015

(86) PCT No.: PCT/KR2015/011675
§ 371 (c)(1),
(2) Date: May 2, 2017

(87) PCT Pub. No.: WO2016/072685
PCT Pub. Date: May 12, 2016

(65) Prior Publication Data
US 2018/0310332 A1    Oct. 25, 2018

Related U.S. Application Data

(60) Provisional application No. 62/074,659, filed on Nov. 4, 2014, provisional application No. 62/096,535, filed on Dec. 23, 2014.

(51) Int. Cl.
H04W 72/14    (2009.01)
H04W 28/26    (2009.01)
(Continued)

(52) U.S. Cl.
CPC .......... *H04W 72/14* (2013.01); *H04W 28/26* (2013.01); *H04W 74/0816* (2013.01); *H04W 72/1268* (2013.01); *H04W 72/1284* (2013.01)

(58) Field of Classification Search
CPC . H04W 16/14; H04W 28/26; H04W 72/0413; H04W 72/14; H04W 72/1284;
(Continued)

(56) References Cited

U.S. PATENT DOCUMENTS 7,394,797 B2 * 7/2008 Kowalski ................ H04L 43/00
370/336
7,403,539 B1 * 7/2008 Tang ...................... H04W 24/00
370/445
(Continued)

FOREIGN PATENT DOCUMENTS

WO    2014111309    7/2014

OTHER PUBLICATIONS

ZTE, "Required functionalities and design targets of LAA," 3GPP TSG-RAN1 #78bis, R1-143827, Oct. 2014, 9 pages.
(Continued)

*Primary Examiner* — Eric Nowlin
(74) *Attorney, Agent, or Firm* — Lee Hong Degerman Kang Waimey

(57) ABSTRACT

Provided are a method for transmitting uplink in an unlicensed band and a device using the same. The device performs a clear channel assessment (CCA) inside a transmission window in an unlicensed band to thereby confirm whether a channel is idle. When the channel is idle, the device transmits an uplink transmission block inside the transmission window in the unlicensed band.

7 Claims, 10 Drawing Sheets

(51) Int. Cl.
*H04W 74/08* (2009.01)
*H04W 72/12* (2009.01)

(58) Field of Classification Search
CPC ............ H04W 74/08; H04W 74/0808; H04W 74/0816
See application file for complete search history.

(56) References Cited

U.S. PATENT DOCUMENTS

| | | | | |
|---|---|---|---|---|
| 7,672,328 B2* | 3/2010 | Konradsson | ........ | H04W 74/085 370/445 |
| 7,876,770 B1* | 1/2011 | Tang | ........ | H04W 24/00 370/338 |
| 8,451,726 B2* | 5/2013 | Baldo | ........ | H04L 43/0829 370/231 |
| 9,008,111 B2* | 4/2015 | An | ........ | H04W 52/0216 370/447 |
| 9,439,091 B2* | 9/2016 | Tian | ........ | H04W 24/08 |
| 9,698,918 B2* | 7/2017 | Hedayat | ........ | H04B 17/318 |
| 9,763,268 B2* | 9/2017 | Son | ........ | H04W 74/08 |
| 9,787,443 B2* | 10/2017 | Damnjanovic | ........ | H04L 5/0007 |
| 9,794,960 B2* | 10/2017 | Ng | ........ | H04W 74/08 |
| 9,936,537 B2* | 4/2018 | Kwon | ........ | H04W 72/0446 |
| 9,942,901 B2* | 4/2018 | Chandrasekhar | ........ | H04W 72/0453 |
| 9,961,718 B2* | 5/2018 | Vajapeyam | ........ | H04W 74/08 |
| 9,967,902 B2* | 5/2018 | Yin | ........ | H04W 74/0816 |
| 10,004,031 B2* | 6/2018 | Seok | ........ | H04W 74/0816 |
| 10,009,774 B2* | 6/2018 | Trainin | ........ | H04W 74/0808 |
| 10,021,721 B2* | 7/2018 | Park | ........ | H04W 74/0816 |
| 10,051,624 B2* | 8/2018 | Kaur | ........ | H04L 5/001 |
| 10,064,066 B2* | 8/2018 | Park | ........ | H04W 74/08 |
| 10,098,145 B2* | 10/2018 | Yun | ........ | H04W 74/002 |
| 10,104,693 B1* | 10/2018 | Zhang | ........ | H04W 74/0816 |
| 10,117,106 B2* | 10/2018 | Barriac | ........ | H04W 16/14 |
| 10,172,164 B2* | 1/2019 | Cariou | ........ | H04B 17/336 |
| 10,178,698 B2* | 1/2019 | Zhang | ........ | H04W 74/0816 |
| 10,199,720 B2* | 2/2019 | Yang | ........ | H04B 7/04 |
| 10,271,325 B2* | 4/2019 | Mukherjee | ........ | H04W 74/0816 |
| 2006/0046688 A1* | 3/2006 | Kowalski | ........ | H04L 43/00 455/405 |
| 2008/0212476 A1* | 9/2008 | Konradsson | ........ | H04W 74/085 370/235 |
| 2009/0129353 A1* | 5/2009 | Ki | ........ | H04W 74/0816 370/338 |
| 2010/0169723 A1* | 7/2010 | Baldo | ........ | H04L 43/0829 714/704 |
| 2012/0230205 A1* | 9/2012 | An | ........ | H04W 52/0216 370/242 |
| 2013/0155931 A1* | 6/2013 | Prajapati | ........ | H04W 72/044 370/311 |
| 2013/0308610 A1* | 11/2013 | Bergstrom | ........ | H04W 56/00 370/336 |
| 2014/0287769 A1 | 9/2014 | Taori et al. | | |
| 2014/0378157 A1* | 12/2014 | Wei | ........ | H04W 16/14 455/454 |
| 2015/0071215 A1* | 3/2015 | Tian | ........ | H04W 24/08 370/329 |
| 2015/0349931 A1* | 12/2015 | Damnjanovic | ........ | H04L 5/0007 370/280 |
| 2016/0021661 A1* | 1/2016 | Yerramalli | ........ | H04W 16/14 370/329 |
| 2016/0080954 A1* | 3/2016 | Hedayat | ........ | H04B 17/318 370/252 |
| 2016/0081010 A1* | 3/2016 | Seok | ........ | H04W 74/0816 370/329 |
| 2016/0081047 A1* | 3/2016 | Kwak | ........ | H04W 56/001 370/350 |
| 2016/0095134 A1* | 3/2016 | Chen | ........ | H04L 1/1861 370/336 |
| 2016/0143014 A1* | 5/2016 | Mukherjee | ........ | H04W 74/0816 370/330 |
| 2016/0192396 A1* | 6/2016 | Ng | ........ | H04W 74/0808 370/329 |
| 2016/0227441 A1* | 8/2016 | Park | ........ | H04W 74/0816 |
| 2016/0302225 A1* | 10/2016 | Damnjanovic | ... | H04W 72/1284 |
| 2016/0309354 A1* | 10/2016 | Yerramalli | ........ | H04W 24/08 |
| 2016/0309498 A1* | 10/2016 | Luo | ........ | H04W 72/1268 |
| 2016/0338096 A1* | 11/2016 | Vajapeyam | ........ | H04L 1/1861 |
| 2016/0345326 A1* | 11/2016 | Yerramalli | ........ | H04W 72/0453 |
| 2016/0345345 A1* | 11/2016 | Malik | ........ | H04W 48/04 |
| 2017/0019909 A1* | 1/2017 | Si | ........ | H04L 47/27 |
| 2017/0019924 A1* | 1/2017 | Wang | ........ | H04W 74/0808 |
| 2017/0055160 A1* | 2/2017 | Barriac | ........ | H04W 16/14 |
| 2017/0094683 A1* | 3/2017 | Sun | ........ | H04L 27/0006 |
| 2017/0099679 A1* | 4/2017 | Zhang | ........ | H04W 16/14 |
| 2017/0135128 A1* | 5/2017 | Yerramalli | ........ | H04W 74/006 |
| 2017/0164406 A1* | 6/2017 | Son | ........ | H04W 74/08 |
| 2017/0171840 A1* | 6/2017 | Mukherjee | ........ | H04W 72/0406 |
| 2017/0188336 A1* | 6/2017 | Ahn | ........ | H04W 72/04 |
| 2017/0196020 A1* | 7/2017 | Mukherjee | ........ | H04W 74/006 |
| 2017/0231006 A1* | 8/2017 | Yin | ........ | H04W 74/0816 |
| 2017/0289972 A1* | 10/2017 | Lei | ........ | H04W 72/042 |
| 2017/0290050 A1* | 10/2017 | Yun | ........ | H04W 74/002 |
| 2017/0302510 A1* | 10/2017 | Yang | ........ | H04B 7/04 |
| 2017/0303136 A1* | 10/2017 | Park | ........ | H04W 74/08 |
| 2017/0303313 A1* | 10/2017 | Cariou | ........ | H04B 17/336 |
| 2017/0311349 A1* | 10/2017 | Zhang | ........ | H04L 5/0005 |
| 2017/0339721 A1* | 11/2017 | Mukherjee | ........ | H04W 16/14 |
| 2017/0373780 A1* | 12/2017 | Ahn | ........ | H04W 72/14 |
| 2018/0006778 A1* | 1/2018 | Damnjanovic | ........ | H04L 5/0007 |
| 2018/0084581 A1* | 3/2018 | Terry | ........ | H04B 1/713 |
| 2018/0103458 A1* | 4/2018 | Tooher | ........ | H04W 16/14 |
| 2018/0115347 A1* | 4/2018 | Yerramalli | ........ | H04B 7/0404 |
| 2018/0124825 A1* | 5/2018 | Lee | ........ | H04W 74/04 |
| 2018/0192442 A1* | 7/2018 | Li | ........ | H04W 74/08 |
| 2018/0199369 A1* | 7/2018 | Larsson | ........ | H04W 74/006 |
| 2018/0213563 A1* | 7/2018 | Yang | ........ | H04W 74/0808 |
| 2018/0255578 A1* | 9/2018 | Kim | ........ | H04W 72/02 |
| 2018/0302926 A1* | 10/2018 | Bhorkar | ........ | H04W 28/065 |
| 2018/0310339 A1* | 10/2018 | Li | ........ | H04W 74/0808 |
| 2018/0324604 A1* | 11/2018 | Yang | ........ | H04W 16/14 |
| 2018/0343589 A1* | 11/2018 | Li | ........ | H04W 74/08 |
| 2018/0352578 A1* | 12/2018 | Zhang | ........ | H04W 74/0816 |
| 2018/0376494 A1* | 12/2018 | Hu | ........ | H04W 24/02 |
| 2019/0007161 A1* | 1/2019 | Xing | ........ | H04L 5/0005 |
| 2019/0045543 A1* | 2/2019 | Valls | ........ | H04W 74/0808 |

OTHER PUBLICATIONS

Samsung, "Views on required funtionalities and design targets for LAA," 3GPP TSG-RAN WG1 #78bis, R1-143878, Oct. 2014, 5 pages.
LG Electronics, "Candidate solutions for LAA operation," 3GPP TSG-RAN WG1 #78bis, R1-144042, Oct. 2014, 8 pages.
PCT International Application No. PCT/KR2015/011675, Written Opinion of the International Searching Authority dated Mar. 31, 2016, 5 pages.

* cited by examiner

METHOD FOR TRANSMITTING UPLINK IN UNLICENSED BAND AND DEVICE USING SAME

CROSS-REFERENCE TO RELATED APPLICATIONS

This application is the National Stage filing under 35 U.S.C. 371 of International Application No. PCT/KR 2015/011675, filed on Nov. 3, 2015, which claims the benefit of U.S. Provisional Application Nos. 62/074,659, filed on Nov. 4, 2014, and 62/096,535, filed on Dec. 23, 2014, the contents of which are all hereby incorporated by reference herein in their entirety.

BACKGROUND OF THE INVENTION

Field of the Invention

The present invention relates to wireless communication, and more particularly, to an uplink transmission method in an unlicensed band in a wireless communication system, and a device using the method.

Related Art

With the explosive increase in mobile data traffic in recent years, a service provider has utilized a wireless local area network (WLAN) to distribute the data traffic. Since the WLAN uses an unlicensed band, the service provider can address a demand for a significant amount of data without the cost of an additional frequency. However, there is a problem in that an interference phenomenon becomes serious due to a competitive WLAN installation between the providers, quality of service (QoS) cannot be guaranteed when there are many users, and mobility cannot be supported. As one of methods for compensating this, a long term evolution (LTE) service in the unlicensed band is emerged.

LTE in unlicensed spectrum (LTE-U) or licensed-assisted access using LTE (LAA) is a technique in which an LTE licensed band is used as an anchor to combine a licensed band and an unlicensed band by the use of carrier aggregation (CA). A user equipment (UE) first accesses a network in the licensed band. A base station (BS) may offload traffic of the licensed band to the unlicensed band by combining the licensed band and the unlicensed band according to a situation.

The LTE-U may extend an advantage of LTE to the unlicensed band to provide improved mobility, security, and communication quality, and may increase a throughput since the LTE has higher frequency efficiency than the legacy radio access technique.

Unlike the licensed band in which exclusive utilization is guaranteed, the unlicensed band is shared with various radio access techniques such as the WLAN. Therefore, each communication node acquires a channel to be used in the unlicensed band in a contention-based manner, and this is called a carrier sense multiple access with collision avoidance (CSMA/CA). Each communication node must perform channel sensing before transmitting a signal to confirm whether a channel is idle, and this is called clear channel assessment (CCA).

Since various wireless access techniques perform the CCA in the unlicensed band, there is a need for a method capable of reducing an interference.

SUMMARY OF THE INVENTION

The present invention provides an uplink transmission method in an unlicensed band, and a device using the method.

In another aspect, a method for uplink transmission in a wireless communication system is provided. The method includes receiving, by a wireless device, an uplink grant for uplink transmission from a base station, performing, by the wireless device, a clear channel assessment (CCA) within a transmission window in an unlicensed band to confirm whether a channel is idle, and when the channel is idle, transmitting, by the wireless device, an uplink transport block to the base station over an uplink transmission band indicated by the uplink grant within the transmission window in the unlicensed band.

The method may further include stopping the transmission of the uplink transport block when a transmission duration of the uplink transport block is beyond the transmission window.

The CCA may be performed over the uplink transmission band.

The method may further include performing the CCA again after waiting until a backoff timer expires when the channel is busy.

In another aspect, a device for a wireless communication system includes a transceiver configured to transmit and receive a radio signal, and a processor operatively coupled to the transceiver. The processor is configured to receive an uplink grant for uplink transmission through the transceiver, perform a clear channel assessment (CCA) through the transceiver within a transmission window in an unlicensed band to confirm whether a channel is idle, and when the channel is idle, transmit an uplink transport block to the base station through the transceiver over an uplink transmission band indicated by the uplink grant within the transmission window in the unlicensed band.

An interference can be reduced in an environment where various communication protocols coexist in an unlicensed band.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

In a carrier aggregation (CA) environment or a dual connectivity environment, the wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as a CI of the primary cell. It is assumed hereinafter that the CI of the primary cell is 0 and a CI of the secondary cell is allocated sequentially starting from 1.

Figure 1:
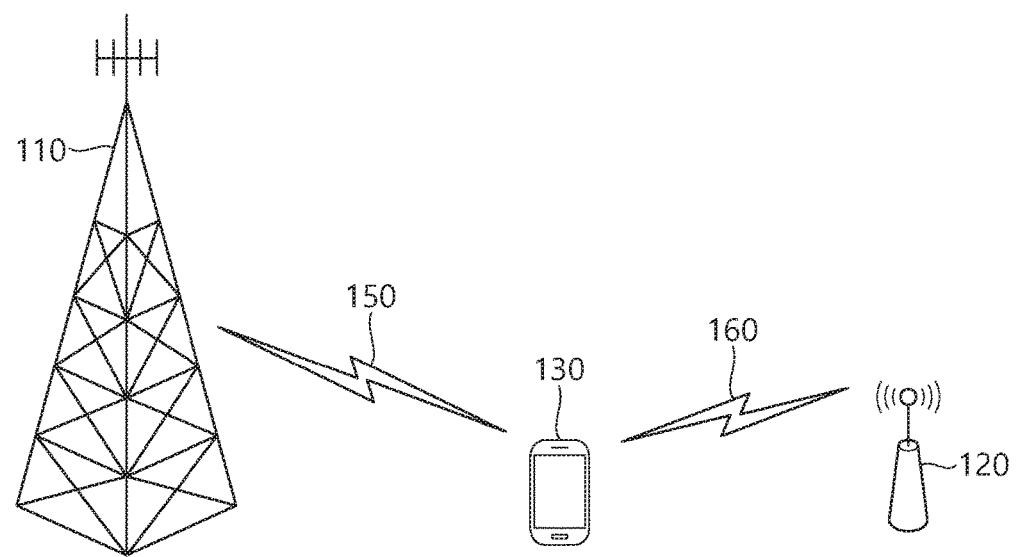
FIG. 1 shows an example of a long term evolution (LTE) service using an unlicensed band.

FIG. 1 shows an example of an LTE service using an unlicensed band.

A wireless device 130 establishes a connection with a 1st BS 110, and receives a service through a licensed band. For UL traffic offloading, the wireless device 130 may receive a service through an unlicensed band with respect to a 2nd BS 120.

The 1st BS 110 is a BS supporting an LTE system, whereas the 2nd BS 120 may also support other communication protocols such as a wireless local area network (WLAN) in addition to LTE. The 1st BS 110 and the 2nd BS 120 may be associated with a carrier aggregation (CA) environment, and a specific cell of the 1st BS 110 may be a primary cell. Alternatively, the 1st BS 110 and the 2nd BS 120 may be associated with a dual connectivity environment, and a specific cell of the 1st BS 110 may be a primary cell. In general, the 1st BS 110 having the primary cell has wider coverage than the 2nd BS 120. The 1st BS 110 may be called a macro cell. The 2nd BS 120 may be called a small cell, a femto cell, or a micro cell. The 1st BS 110 may operate the primary cell and zero or more secondary cells. The 2nd BS 120 may operate one or more secondary cells. The secondary cell may be activated/deactivated by an indication of the primary cell.

The above description is for exemplary purposes only. The 1st BS 110 may correspond to the primary cell, and the 2nd BS 120 may correspond to the secondary cell, so that the cell can be managed by one BS.

The licensed band is a band in which an exclusive use is guaranteed to a specific communication protocol or a specific provider.

The unlicensed band is a band in which various communication protocols coexist and a shared use is guaranteed. The unlicensed band may include 2.5 GHz and/or 5 GHz band used in a WLAN.

It is assumed in the unlicensed band that a channel is occupied basically through contention between respective communication nodes. Therefore, in communication in the unlicensed band, it is required to confirm that signal transmission is not achieved by other communication nodes by performing channel sensing. For convenience, this is called a listen before talk (LBT), and if it is determined that signal transmission is not achieved by other communication nodes, this case is defined as confirmation of clear channel assessment (CCA).

The LBT must be performed preferentially in order for a BS or wireless device of an LTE system to have access to a channel in the unlicensed band. Further, when the BS or wireless device of the LTE system transmits a signal, an interference problem may occur since other communication nodes such as the WLAN or the like also perform the LBT. For example, in the WLAN, a CCA threshold is defined as −62 dBm as to a non-WLAN signal and is defined as −82 dBm as to a WLAN signal. This means that interference may occur in an LTE signal due to other WLAN devices when the LTE signal is received with power less than or equal to −62 dBm.

Hereinafter, when it is said that 'LBT is performed' or 'CCA is performed', it implies that whether a channel is idle or is used by another node is confirmed first and thereafter the channel is accessed.

Hereinafter, the LTE and the WLAN are described for example as a communication protocol used in the unlicensed band. This is for exemplary purposes only, and thus it may also be said that a 1st communication protocol and a 2nd communication protocol are used in the unlicensed band. A BS supports the LTE. A UE is a device supporting the LTE.

Hereinafter, although it is described that downlink (DL) transmission is based on transmission performed by a BS and uplink (UL) transmission is based on transmission performed by a UE, the DL transmission and the UL transmission may also be performed by a transmission node or node group in a wireless network. The UE may imply an individual node which exists for each user, and the BS may imply a central node for transmitting/receiving and controlling data for a plurality of individual nodes. From this perspective, the term 'BS' may be replaced with a DL node, and the term 'UE' may be replaced with a UL node.

Now, 3GPP LTE downlink (DL)/uplink (UL) scheduling and physical channels will be described.

In 3GPP LTE, the DL/UL scheduling is achieved in unit of subframes. The subframe includes a plurality of orthogonal frequency division multiplexing (OFDM) symbols, and a time required to transmit one subframe is defined as a transmission time interval (TTI). 1 TTI may be 1 ms. In 3GPP LTE, in case of a normal cyclic prefix (CP), one subframe includes 14 OFDM symbols, and in case of an extended CP, one subframe includes 12 OFDM symbols.

In 3GPP LTE, a DL physical channel may include a physical downlink control channel (PDCCH), a physical control format indicator channel (PCFICH), a physical hybrid-ARQ indicator channel (PHICH), and a physical downlink shared channel (PDSCH). A UL physical channel may include a physical uplink control channel (PUCCH) and a physical uplink shared channel (PUSCH).

The PCFICH transmitted in a $1^{st}$ OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

The PHICH carries a positive-acknowledgement (ACK)/negative-acknowledgement (NACK) signal for a UL hybrid automatic repeat request (HARQ). The ACK/NACK signal for UL data on a PUSCH transmitted by the wireless device is transmitted on the PHICH.

Control information transmitted through the PDCCH is referred to as downlink control information (DCI). The DCI may include resource allocation of the PDSCH (this is referred to as a DL grant) and resource allocation of a PUSCH (this is referred to as a UL grant).

Figure 2:
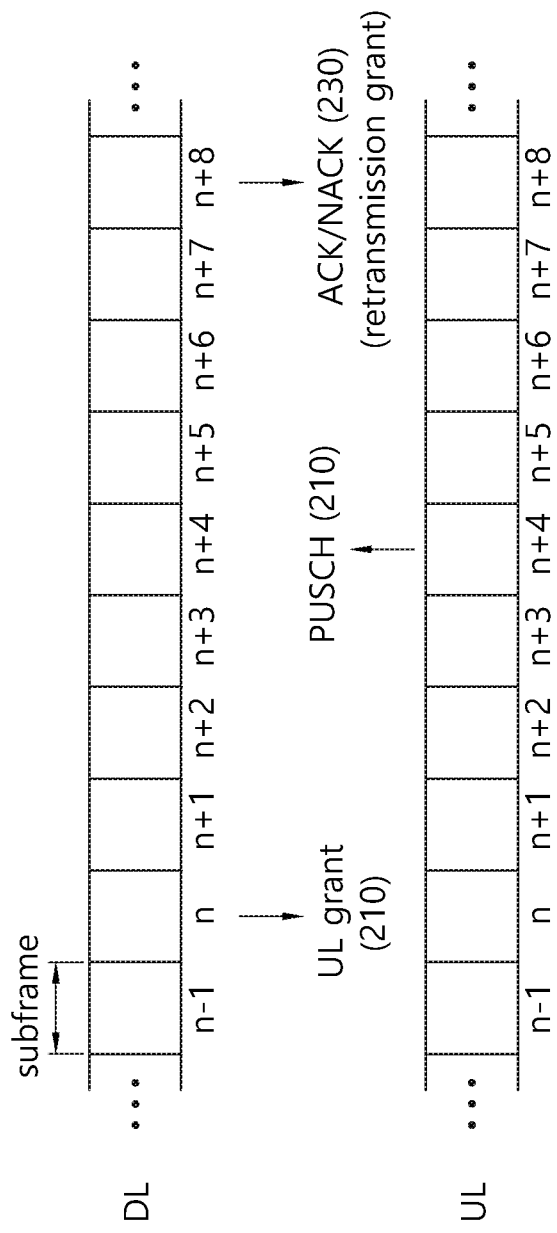
FIG. 2 shows an example of performing uplink (UL) transmission in $3^{rd}$ generation partnership project (3GPP) LTE.

FIG. 2 shows an example of performing UL transmission in 3GPP LTE.

A UE receives a UL grant 210 having PUSCH resource allocation from a BS in a DL subframe. In addition, the UE transmits a UL transport block to the BS on a PUSCH 220 in a UL subframe n+k. In 3GPP LTE, it is fixed to k=4.

The UE receives an ACK/NACK signal 230 for the UL transport block on a PHICH in a DL subframe n+k+j. Herein, j=4. The ACK/NACK signal may be reception acknowledgement for the UL transport block. The ACK/NACK signal is an ACK signal when decoding of the UL transport block is successful, and is a NACK signal when the decoding of the UL transport block fails. If the ACK/NACK signal is NACK, the BS may transmit a retransmission grant for retransmission to the UE.

The UE may transmit a retransmission transport block to the BS on a PUSCH indicated by the retransmission grant in a UL subframe n+k+j+k.

As described above, in 3GPP LTE, UL transmission is achieved in the order of UL grant->PUSCH->ACK/NACK at fixed timing (e.g., an interval of 4 subframes). However, in an unlicensed band, since the UE first performs CCA and thereafter determines whether to transmit a signal, it may be difficult to maintain the timing.

Hereinafter, UL transmission in an unlicensed band is proposed.

Figure 3:
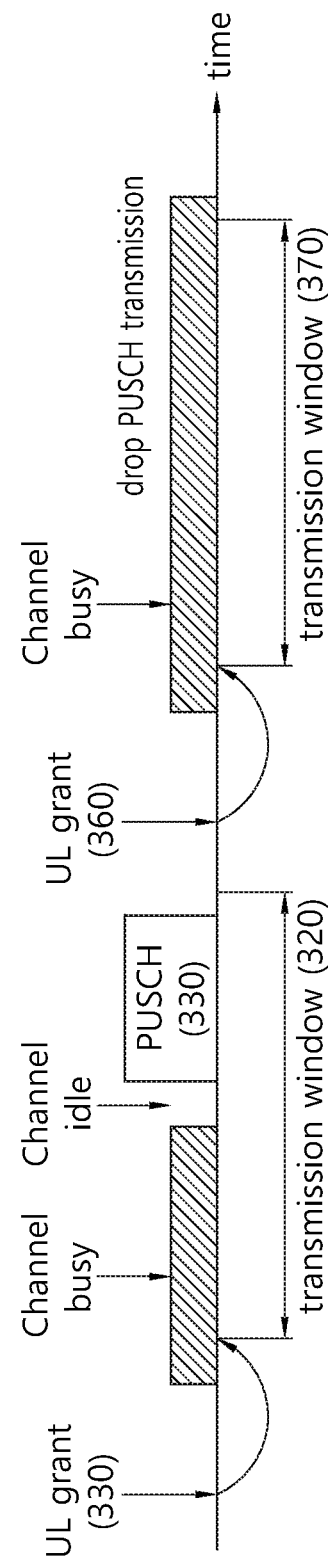
FIG. 3 shows UL transmission according to an embodiment of the present invention.

FIG. 3 shows UL transmission according to an embodiment of the present invention.

A transmission window in which a UE performs UL transmission may be configured. The UE performs CCA within the transmission window. When a channel is busy, whether the channel is idle is determined again after waiting until a backoff time expires. If the channel is idle, UL transmission may be performed within the transmission window.

A BS may configure the transmission window through DCI or radio resource control (RRC) signaling. For example, the DCI may include not only PUSCH resource allocation but also configuration information of the transmission window.

The configuration of the transmission window may include information regarding a length and/or start point of the transmission window. Alternatively, the transmission window may be determined on the basis of a specific parameter (e.g., a cell ID, a UE ID, a subframe index, a radio frame index, a combination of them, etc.).

The transmission window may be defined on the basis of a reference time of a licensed cell.

The UE may regard that the transmission window is configured when a specific time elapses after the UL grant is received.

A different configuration may be applied to the transmission window according to a UL signal characteristic (e.g., initial transmission, retransmission, UL control signals, etc.). For example, a transmission window for retransmission may have a shorter length than a transmission window for initial transmission.

Referring to an example of FIG. 3, the UE receives a UL grant 310 from a BS. The UE attempts UL transmission within a transmission window 320 activated by the UL grant 310. If a channel is busy, it is waited for a backoff duration. If the channel is idle, a PUSCH 330 indicated by the UL grant 310 is transmitted within the transmission window 320.

The UE may start PUSCH transmission in a given transmission window, or may transmit a PUSCH only when the PUSCH transmission can be finished. If the PUSCH transmission cannot be complete within the transmission window, the PUSCH transmission may be dropped or delayed. For example, the UE may drop the PUSCH transmission if the channel is busy during the transmission window 370 activated by the UL grant 360.

Figure 4:
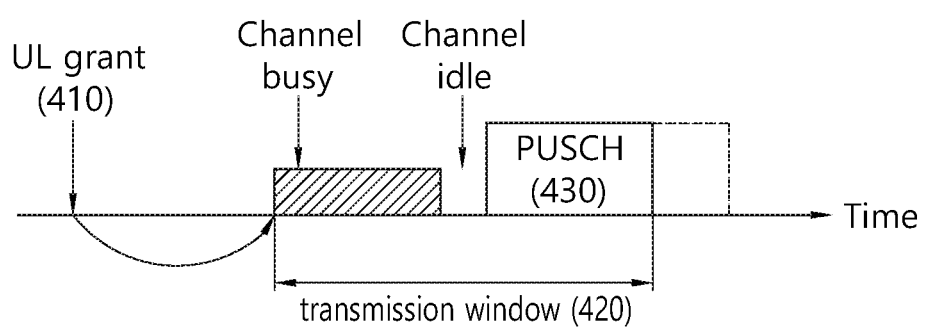
FIG. 4 shows UL transmission according to another embodiment of the present invention.

FIG. 4 shows UL transmission according to another embodiment of the present invention.

If a scheduled PUSCH transmission time is beyond a given transmission window, PUSCH transmission may stop at a start point of the transmission window.

A UE receives a UL grant 410 from a BS. The UE attempts UL transmission within a transmission window 420 activated by the UL grant 410. If a channel is busy, it is waited for a backoff duration. If the channel is idle, a PUSCH 430 indicated by the UL grant 410 is transmitted within the transmission window 420. Transmission of a PUSCH 430 may be dropped when it is beyond the transmission window 420.

It is assumed that PUSCH transmission is achieved in unit of subframes, and PUSCH transmission is scheduled for the UE through a plurality of subframes. The PUSCH transmission may be suspended in a subframe beyond the transmission window 420.

A boundary of the transmission window 420 may be located in some areas of the subframe. A short PUSCH (sPUSCH) may be defined to transmit UL data in the some areas of the subframe within the transmission window 420.

Figure 5:
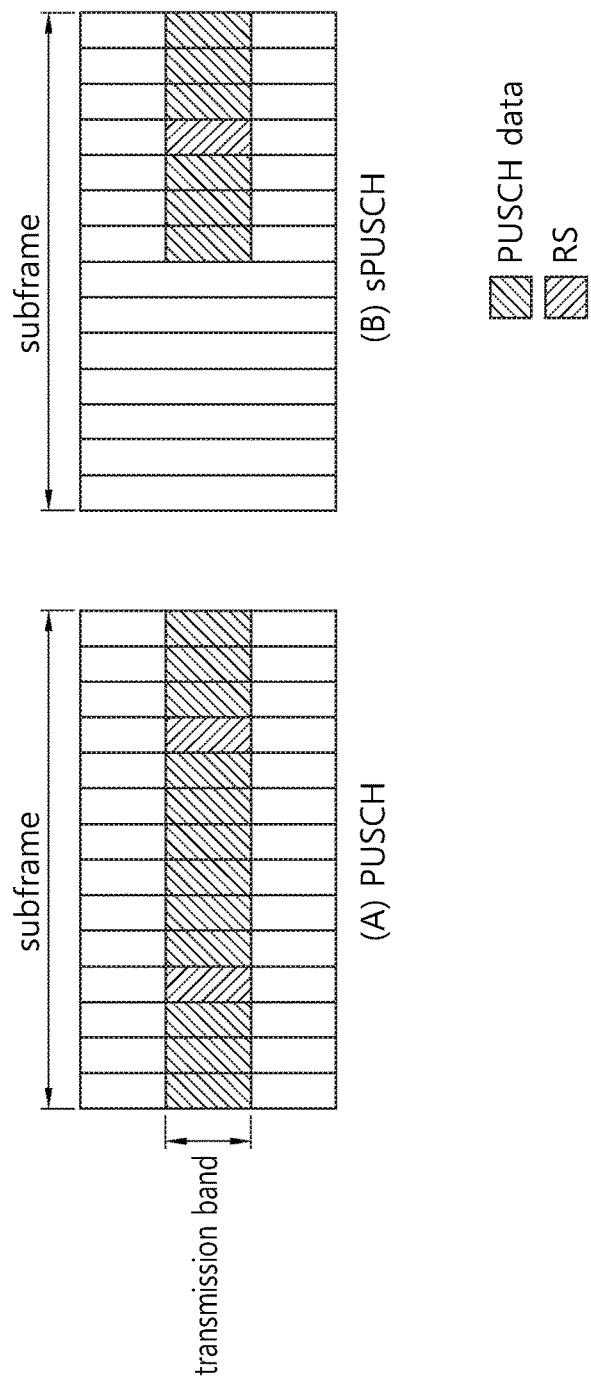
FIG. 5 shows an example of a UL channel.

FIG. 5 shows an example of a UL channel.

This is a case where one subframe includes 14 OFDM symbols. FIG. 5(A) shows a PUSCH of 3GPP LTE. A reference signal (RS) for demodulation of UL data is transmitted on $4^{th}$ and $11^{th}$ OFDM symbols, and the UL data (i.e., UL transport block) is transmitted on the remaining OFDM symbols.

FIG. 5(B) shows that a PUSCH is transmitted on last 7 OFDM symbols of the subframe. This is called an sPUSCH to distinguish from a PUSCH transmitted on the entire subframes. An OFDM symbol used in transmission of the sPUSCH may be called a transmission symbol, and the other OFDM symbols may be called non-transmission symbols. The sPUSCH may be transmitted on one or more transmission symbols in the subframe, and there is no restriction on an arrangement and the number of transmission symbols.

When the sPUSCH is transmitted, resource element (RE) mapping for PUSCH data in the subframe may be achieved in such a manner that a part corresponding to the non-transmission symbol is not transmitted while directly conforming to RE mapping for a case of PUSCH transmission. That is, it is equivalent to a case of performing puncturing on the non-transmission symbol while performing data-RE mapping through the entire subframes in the same manner as in the PUSCH. This may be advantageous when enabling decoding in at least actual transmission symbols even if there is a mismatch on transmission symbols used in sPUSCH transmission in a subframe between a BS and a UE.

Figure 6:
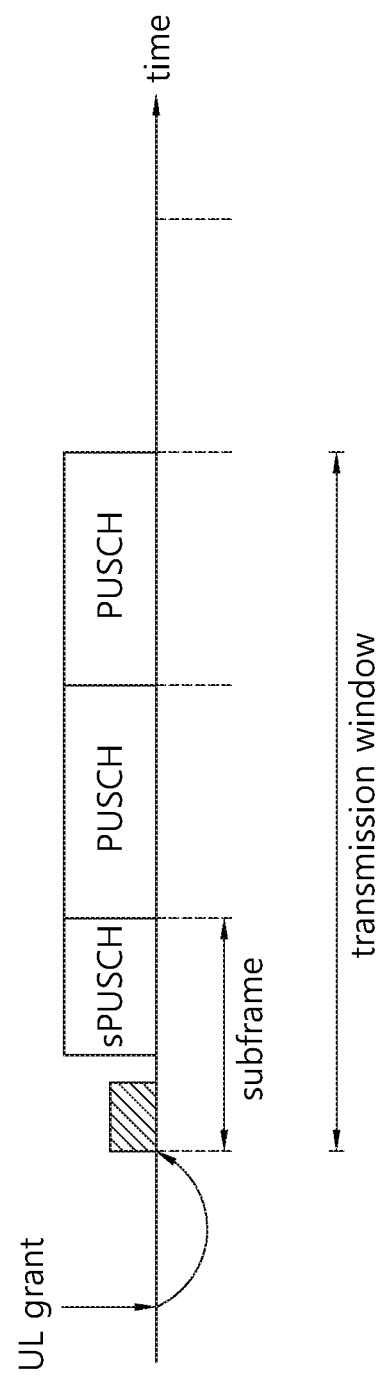
FIG. 6 shows UL transmission according to another embodiment of the present invention.

FIG. 6 shows UL transmission according to another embodiment of the present invention.

It is assumed that PUSCH transmission is achieved in unit of subframes, and PUSCH transmission is scheduled for the UE through three subframes. If a channel is idle from a specific OFDM symbol in one subframe, an sPUSCH may be transmitted after the specific OFDM symbol, and the PUSCH may be transmitted in the remaining subframes within the transmission window 420.

Figure 7:
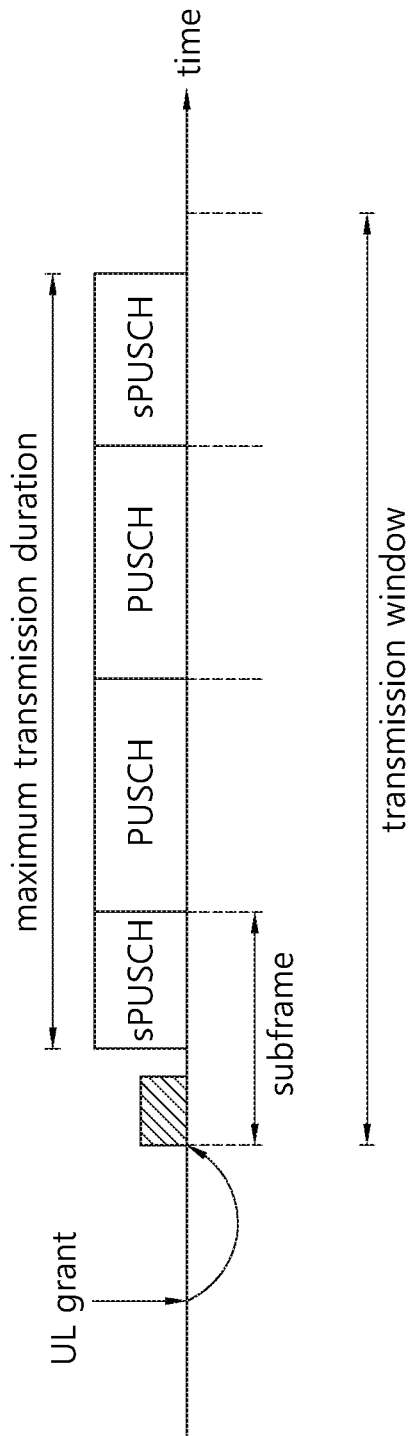
FIG. 7 shows UL transmission according to another embodiment of the present invention.

FIG. 7 shows UL transmission according to another embodiment of the present invention.

It shows that a UE transmits an sPUSCH in a last UL subframe in which scheduling is continuously achieved for a maximum transmission duration. This is to transmit as much data as possible within a corresponding regulation if there is a restriction on the maximum transmission duration in an unlicensed band.

A BS may report information regarding a position or the number of symbols to be used in PUSCH transmission in the last subframe through PUSCH scheduling.

In the embodiment of FIG. 3 to FIG. 7, the UE may start to perform CCA prior to a scheduled PUSCH transmission start point or a start point of a transmission window capable of transmitting the PUSCH. In addition, if a channel idle state is detected, the UE may transmit a reservation signal to reserve channel occupation so that other nodes cannot transmit signals. The reservation signal may be maintained until PUSCH transmission starts. Alternatively, if the channel idle state is detected also within the transmission window, the reservation signal may be transmitted until a start of a subframe boundary in which the PUSCH can be actually transmitted.

In the embodiment of FIG. 3 to FIG. 7, the UE may perform CCA only for a 'transmission band for transmitting the PUSCH' by the UE, and may determine whether the channel is idle. The BS may schedule PUSCH transmission by using the same transmission window to a UE group. A UE belonging to the UE group may transmit the PUSCH at different timing in the same transmission window, or may transmit the PUSCH in different transmission bands.

Figure 8:
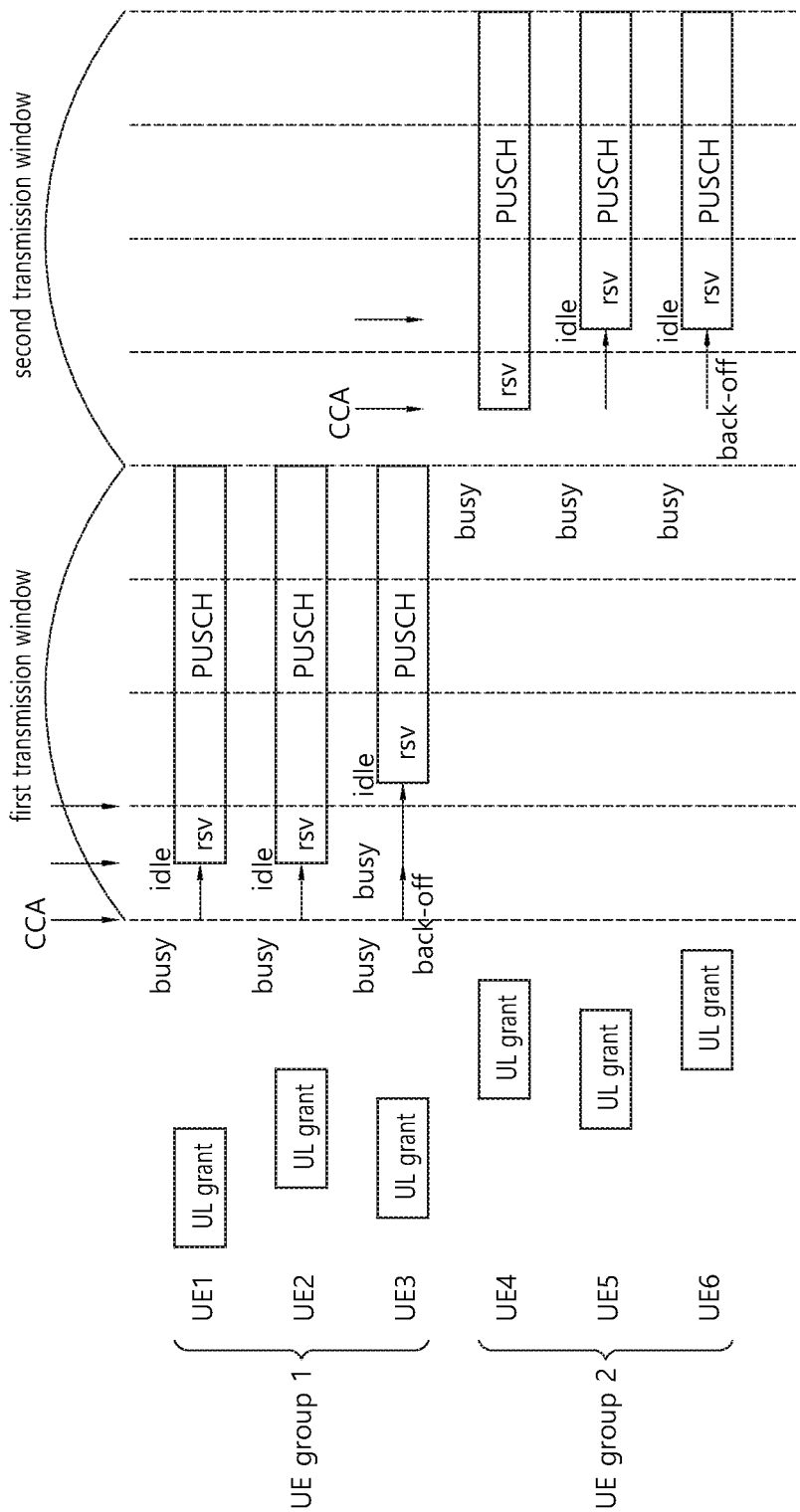
FIG. 8 shows UL transmission according to another embodiment of the present invention.

FIG. 8 shows UL transmission according to another embodiment of the present invention.

It is assumed that a UE group 1 includes a UE1, a UE2, and a UE3, and a UE group 2 includes a UE4, a UE5, and a UE6. A first transmission window is configured for the UE group 1, and a second transmission window is configured for the UE group 2.

Each UE receives a UL grant in a corresponding UE group, and transmits a PUSCH after performing CCA in a corresponding transmission window. In the UE group, each UE performs the CCA in different bands, and performs PUSCH transmission. Each UE may perform the CCA only in a transmission band in which it is scheduled, and may transmit the PUSCH when a channel is idle.

Each UE may transmit a reservation signal (indicated by 'rsv' in the figure) before its PUSCH is transmitted. The reservation signal may be transmitted in the same band as a transmission band in which a corresponding PUSCH is scheduled.

The UE may report to a BS about information regarding the PUSCH actually transmitted within the transmission window. The information may be reported to the BS through a cell of a licensed band. For example, the UE may report information regarding the number of subframes in which the PUSCH is transmitted, the number of OFDM symbols in which the PUSCH is transmitted, whether an sPUSCH is transmitted, or the like.

In the aforementioned embodiment, the UE starts a backoff timer through the CCA if a channel is busy. After the backoff timer expires, a channel state of the CCA is confirmed again, and UL transmission is performed if the channel is idle. The backoff timer may be defined by using the number of times of entering a channel idle state, a time duration in which the channel idle state is maintained, or the like.

If a value of the backoff timer is randomly defined, there may be an increase in uncertainty for a time at which the BS detects the PUSCH. Therefore, the BS may provide the UE with information regarding the backoff timer. The backoff timer information may include at least any one of a backoff timer value, a minimum/maximum backoff timer, and a parameter required to generate the backoff timer value. Information regarding the backoff timer may be included in a UL grant or may be given by MAC/RRC signaling. Alternatively, the UE may determine the backoff timer value on the basis of a cell ID, a UE ID, a subframe index, or a transmission window.

Meanwhile, the BS may first perform the CCA, and may schedule the PUSCH for an idle channel (or an idle transmission band). The UE to which the PUSCH is scheduled does not need to additionally perform the CCA. To reduce collision among a plurality of BSs, a BS-specific backoff timer may be configured for each BS. Information regarding information for the backoff timer of each BS may be shared, or may be determined on the basis of a cell ID, a subframe index, or the like.

Figure 9:
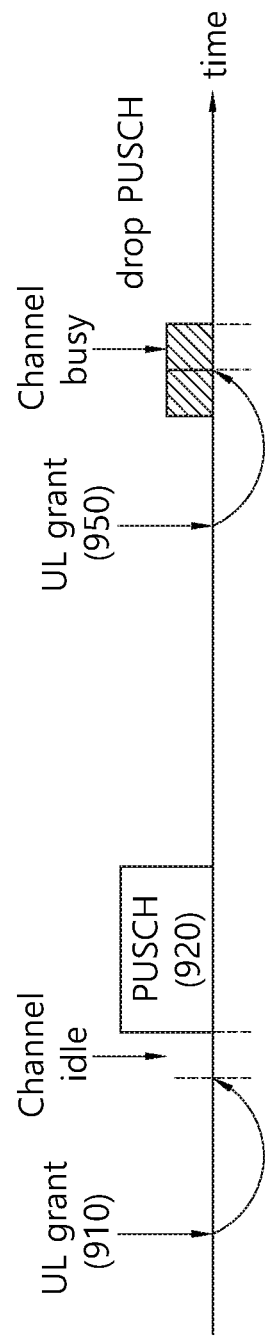
FIG. 9 shows UL transmission according to another embodiment of the present invention.

FIG. 9 shows UL transmission according to another embodiment of the present invention.

A UE transmits a PUSCH after PUSCH scheduling is achieved from a BS or when a channel idle state is detected by performing CCA at a scheduled PUSCH transmission time. If it is not the channel idle state, PUSCH transmission may be dropped or delayed.

The UE receives a UL grant 910. After a specific time (e.g., 4 subframes) elapses, the UE confirms a channel state, and if the channel is idle, transmits a PUSCH 920. If the channel is not idle, PUSCH transmission may be dropped.

If the UE drops the PUSCH transmission, the UE may discard corresponding PUSCH scheduling. Alternatively, if the UE drops the PUSCH transmission, the UE may transmit NACK to the BS to perform an HARQ operation. Upon receiving the NACK, the BS may transmit only a retransmission request without PUSCH scheduling information. The UE may perform retransmission based on previous PUSCH scheduling.

When the UE drops the PUSCH transmission and performs retransmission based on the HARQ, how to operate a redundancy version (RV) is proposed as follows.

First, the UE may retransmit a PUSCH of the same RV as the PUSCH of which transmission is dropped. In this method, if system bits of a transport block are dropped, the system bits are transmitted in next retransmission, thereby avoiding deterioration in decoding performance.

Second, a PUSCH of an RV which changes based on a predetermined rule may be transmitted irrespective of whether a previous PUSCH is dropped. This method can prevent an RV of a retransmission PUSCH from being differently recognized between the BS and the UE if the BS cannot correctly detect whether the PUSCH is dropped.

Third, the BS may allow a scheduling command for PUSCH retransmission to include the RV, and the UE may transmit the PUSCH according to the RV in the PUSCH retransmission. The RV may also be included not only in the scheduling command for retransmission PUSCH but also in a scheduling command for initial transmission.

Figure 10:
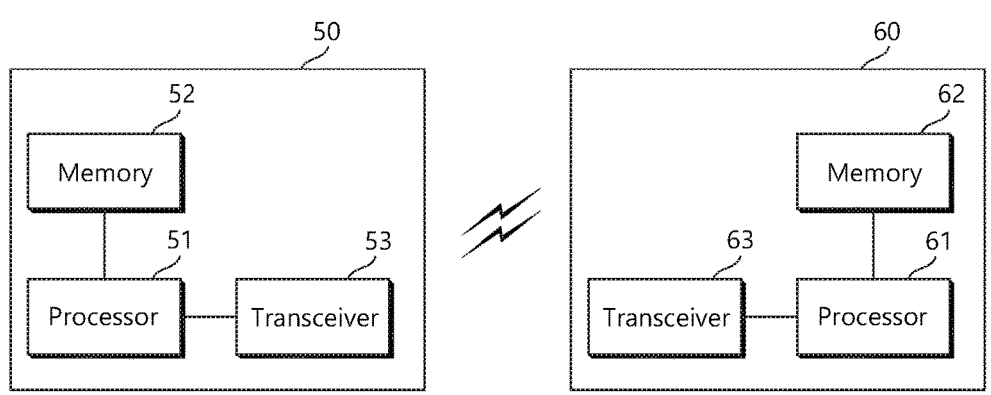
FIG. 10 is a block diagram showing a wireless communication system according to an embodiment of the present invention.

FIG. 10 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting an uplink transport block in a wireless communication system, the method comprising:
   receiving, by a wireless device from a base station, an uplink grant scheduling at least one first subframe and at least one second subframe for transmitting an uplink transport block,
   wherein the uplink grant scheduling includes scheduling a transmission of the uplink transport block during the at least one first subframe and the at least one second subframe;
   performing, by the wireless device, a clear channel assessment (CCA) within a transmission window in an unlicensed band to determine whether a channel is idle or busy during the transmission window;
   when the CCA determines that the channel is busy during the transmission window, dropping the scheduled transmission of the uplink transport block in the at least one first subframe and the at least one second subframe; and
   when the CCA determines that the channel is idle, performing the scheduled transmission, by the wireless device, of the uplink transport block to the base station in the at least one first subframe within the transmission window in the unlicensed band,
   wherein the performing the scheduled transmission includes:
      determining whether the at least one first subframe and the at least second subframe are within a transmission window, and
      suspending the scheduled transmission of the uplink transport block in the at least one second subframe when the at least one second subframe is beyond the transmission window.

2. The method of claim 1, further comprising:
   when the channel is busy, performing the CCA again after waiting until a backoff timer expires.

3. The method of claim 2, wherein the uplink grant comprises information regarding the backoff timer.

4. The method of claim 1, further comprising:
   transmitting a reservation signal for occupying the channel before the uplink transport block is transmitted.

5. The method of claim 1, wherein the uplink grant comprises information regarding the transmission window.

6. The method of claim 1, further comprising:
   establishing, by the wireless device, a connection with a primary cell operating in a licensed band; and
   activating, by the wireless device, a secondary cell operating in the unlicensed band by an instruction of the primary cell.

7. A device for transmitting an uplink transport block in a wireless communication system, the device comprising:
   a transceiver that transmits and receives a radio signal; and
   a processor operatively coupled to the transceiver and configured to:
      receive an uplink grant scheduling at least one first subframe and at least one second subframe for transmitting an uplink transport block through the transceiver,
      wherein the uplink grant scheduling includes scheduling a transmission of the uplink transport block during the at least one first subframe and the at least one second subframe;
      perform a clear channel assessment (CCA) through the transceiver within a transmission window in an unlicensed band to determine whether a channel is idle or busy during the transmission window;
      when the CCA determines that the channel is busy during the transmission window, drop the scheduled transmission of the uplink transport block in the at least one first subframe and the at least one second subframe; and
      when the CCA determines that the channel is idle, performing the scheduled transmission of the uplink transport block to the base station through the transceiver in the at least first subframe within the transmission window in the unlicensed band,
      wherein the performing the scheduled transmission includes:

determining whether the at least one first subframe and the at least second subframe are within a transmission window, and suspending the scheduled transmission of the uplink transport block in the at least one second subframe when the at least one second subframe is beyond the transmission window.

\* \* \* \* \*